United States Patent
Bhakta et al.

(10) Patent No.: US 10,083,483 B2
(45) Date of Patent: Sep. 25, 2018

(54) ACTIONABLE EXCEPTION ALERTS

(71) Applicant: Bank of America Corporation, Charlotte, NC (US)

(72) Inventors: Shiva-Sanjay Bhakta, Hainesport, NJ (US); Jeffrey R. Goertz, Liberty, MO (US); Kerry Michelle Cantley, Fort Mill, SC (US); Eric Dryer, Charlotte, NC (US); James W. Stark, III, Schenectady, NY (US); Mike Stoll, Webster Groves, MO (US); Tim Gauvin, Peachtree City, GA (US); Geoffrey R. Williams, Midlothian, TX (US); Krishna Kota, Bear, DE (US)

(73) Assignee: Bank of America Corporation, Charlotte, NC (US)

( * ) Notice: Subject to any disclaimer, the term of this patent is extended or adjusted under 35 U.S.C. 154(b) by 1133 days.

(21) Appl. No.: 13/737,717

(22) Filed: Jan. 9, 2013

(65) Prior Publication Data

US 2014/0195396 A1 Jul. 10, 2014

(51) Int. Cl.
*G06Q 40/00* (2012.01)
*G06Q 40/02* (2012.01)

(52) U.S. Cl.
CPC .................... *G06Q 40/02* (2013.01)

(58) Field of Classification Search
CPC .... G06Q 40/02; G06Q 20/40; G06Q 20/1085; G06Q 20/3674
USPC ...... 705/35, 43; 382/137, 138, 150; 235/379
See application file for complete search history.

(56) References Cited

U.S. PATENT DOCUMENTS

| | | | |
|---|---|---|---|
| 5,893,131 A | 4/1999 | Kornfeld | |
| 6,643,569 B2 | 11/2003 | Miller et al. | |
| 6,643,797 B1 | 11/2003 | Horowitz | |
| 7,370,244 B2 | 5/2008 | Breitling et al. | |
| 7,451,391 B1 | 11/2008 | Coleman et al. | |
| 7,594,600 B2 | 9/2009 | Mueller et al. | |
| 8,167,196 B2 | 5/2012 | Mueller et al. | |
| 8,510,214 B2* | 8/2013 | Imrey | G06Q 20/10 705/35 |
| 2002/0184133 A1 | 12/2002 | Zangari et al. | |
| 2007/0127782 A1 | 6/2007 | McMonagle et al. | |
| 2008/0027873 A1 | 1/2008 | Ofir et al. | |
| 2008/0208610 A1 | 8/2008 | Thomas et al. | |
| 2009/0271231 A1* | 10/2009 | Buddenbaum | G06Q 10/0875 705/29 |
| 2010/0082470 A1 | 4/2010 | Walach et al. | |
| 2010/0145857 A1 | 6/2010 | Davila et al. | |
| 2011/0125643 A1 | 5/2011 | Cameo et al. | |
| 2012/0095913 A1 | 4/2012 | Seay et al. | |
| 2012/0226645 A1 | 9/2012 | O'Rourke | |
| 2013/0191261 A1 | 7/2013 | Chandler et al. | |

* cited by examiner

*Primary Examiner* — Olabode Akintola
(74) *Attorney, Agent, or Firm* — Banner & Witcoff, Ltd.; Michael A. Springs

(57) ABSTRACT

Systems, method, apparatuses, and software are described for automatically detecting defects in financial transactions, automatically determining resolutions to the defects based on historical defect patterns, an interacting with customers to provide information and/or receive instructions regarding defects and how they should be resolved.

20 Claims, 6 Drawing Sheets

ACTIONABLE EXCEPTION ALERTS

BACKGROUND

Banks and other types of financial institutions are able to manage extremely large numbers of financial transactions on a daily basis. Some of the financial transactions are straightforward, such as a check deposit, whereas others are relatively complex. Due to the large number of opportunities for error, with sources spanning the gamut of the financial system from the customer to the bank teller to the financial institution's computer system, financial institutions are also increasingly utilizing more resources to correct defects in a significant portion of those transactions.

Such defects, also sometimes referred to as exceptions, are often not detected unless a human operator, or even the customer, recognizes the defect. Even where inconsistencies may be detected by the computer system, such detection is very limited and provides no opportunities to take steps to reduce such errors in the future. Because error resolution requires significant resources, it would be desirable to find a way to reduce the needed resources, such by more efficiently detecting defects, more effectively resolving defects, and/or finding ways to reduce predictable future defects from occurring in the first place.

SUMMARY

Aspects as described herein provide example methods, software, apparatuses, and systems that may learn and establish (for instance, using predictive analytics) patterns of various defects associated with customer transactions. The patterns may be automatically detected by the system with or without human intervention. Moreover, the system may automatically resolve, or may assist with resolution of, defects (also referred to herein as exceptions) using an automation engine and/or recommendation engines. The automation and/or recommendation engines may be configured such that the system may intervene and/or otherwise modify banking processes to correct the defects and/or provide recommendations for correcting the defects.

Customer Transactions may enter the banking system through any of various banking channels related to the processing of a financial transaction. The system may receive information associated with the transactions (for example, attributes of the transactions), and may perform predictive analytics on the received transaction information and/or previously received historical transaction information to detect suspected defects in transactions. Defects that may be detected may include, for example, unreadable check image, check feed error, MICR read error, closed account, or incorrect routing number, encoding error, out-of-balance teller or ATM, wrong amount, no posting at all of deposit or withdrawal, double posting, non-payable items such as bad check or inadequate balance, and the like.

Accordingly, some aspects as described herein are directed to, for example, systems, apparatuses, software, and methods for performing at least the following: determining, by at least one computer, based on a defect in a financial transaction, a financial product, and sending a message over a network identifying the determined financial product.

Further aspects as described herein are directed to systems, apparatuses, software, and methods for performing at least the following: storing, in at least one non-transitory computer-readable medium, a history of defects in financial transactions, and using, by at least one computer, the stored history to determine a change to a service plan of a bank account. The determined change may then be made to the service plan of the bank account.

Still further aspects as described herein are directed to systems, apparatuses, software, and methods for performing at least the following: using, by at least one computer, a profile of a bank customer and a pattern of historical defects in financial transactions of the customer to determine a marketing offer for a feature of a bank account service plan, and sending a message over a network to the customer identifying the determined marketing offer.

Yet further aspects as described herein are directed to systems, apparatuses, software, and methods for performing at least the following: determining, by at least one computer, a defect in a financial transaction, determining, by the at least one computer, a service level of a bank account associated with the financial transaction, and determining, based on the service level, whether to provide a current status of resolution of the defect. If so, the at least one computer may send the information identifying the current status.

Still further aspects as described herein are directed to systems, apparatuses, software, and methods for performing at least the following: determining, by at least one computer, a defect in a financial transaction, and determining, by the at least one computer, a service level of a bank account associated with the financial transaction. Based on the service level, it may be selected whether to provide a current status of resolution of the defect or to wait until a next scheduled notification time. The at least one computer may send information identifying the current status either in response to the selecting or at the next scheduled notification time, depending upon the outcome of the selection.

Still further aspects as described herein are directed to systems, apparatuses, software, and methods for performing at least the following: determining, by at least one computer, a defect in a financial transaction, and determining, by the at least one computer, a service level of a bank account associated with the financial transaction. In response to an update to a current status of a resolution to the defect, it may be determined, based on the service level, whether to provide information identifying the update. If so, the at least one computer may send the information.

Yet further aspects as described herein are directed to systems, apparatuses, software, and methods for performing at least the following: detecting, by at least one computer, a defect in a financial transaction, determining a destination based on a customer profile associated with the financial transaction, and sending, over a network, a message to the destination identifying the defect These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various examples of methods and systems are described that may be able to learn or otherwise determine patterns of defects associated with customer financial transactions. Using the determined defect patterns, the methods and systems may detect and/or predict defects, and may partially or fully automate a resolution of the defects using banking processes and systems that are in place.

Figure 1:
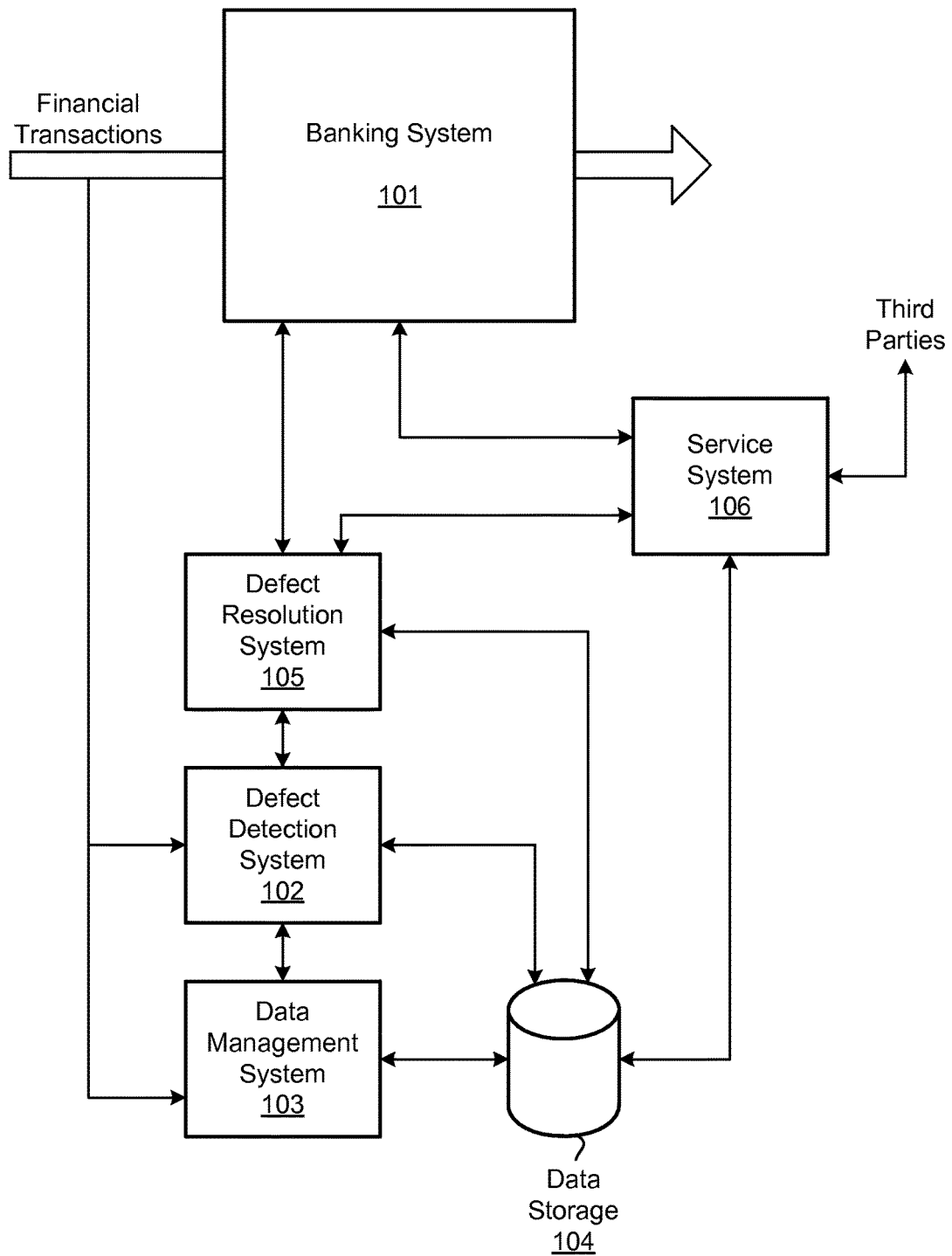
FIG. 1 illustrates an example system that may be used to implement one or more aspects as described herein.

FIG. 1 illustrates an example system that may be used to implement one or more aspects as described herein. In the shown example, the system may include a banking system 101, a defect detection system 102, a data management system 103, data storage 104, a defect resolution system 105, and a service system 106. The various elements 101-106 of this example may be communicatively interconnected in the configuration shown, or in other configurations as desired. Moreover, while the various elements 101-106 of this example are shown as separate blocks, any of the blocks may be combined with one another and/or further subdivided as desired. The blocks of FIG. 1 may indicate a functional and/or a physical distinction between the various systems and other elements. For example, while each of the elements 101-106 are shown as individual blocks, any of these elements 101-106 may be implemented as one or more physical devices, such as one or more computing devices, one or more networks, one or more human operators, and/or any other physical and/or logical infrastructure.

Banking system 101, in this example, represents some or all of a financial institution's infrastructure, which may include automated teller machines (ATMs), human tellers, banking facilities, communication networks, data storage devices, computing devices, implementers of business rules, cash vaults, business offices, and the like. Banking system 101 is shown generically here, because each financial institution may be expected to have a significantly different configuration of its individual banking system. Although elements 102-106 are shown in this example as being separate from the banking system 101, this is an arbitrary boundary—any of these elements 102-106 may be partially or fully integral with and part of the banking system 101, and may or may not share the same physical and/or logical resources as the banking system 101.

The banking system 101 may, in general, process any number of financial transactions, such as but not limited to processing checks, processing cash, implementing monetary transfers between accounts (within the financial institution and/or with other financial institutions), wiring funds, performing audits, providing information to customers about accounts, opening and closing accounts, investing funds, and implementing lockbox services. The financial transactions (and any defects associated with the financial transactions) may enter the banking system 101 through any of various channels, including but not limited to: banking centers, mobile and ATM devices, financial-institution-to-financial-institution channels, ACH channel, WIRE channel, and the like.

The defect detection system 102 may be responsible for detecting defects (or suspected defects) in the financial transactions passing through the banking system 101. The defect detection system 102 may receive information about the financial transactions via, for instance, any of the above-mentioned channels. The defect detection system 102 may further use such transaction information to (1) determine patterns in the detected defects based on historical defects and/or (2) detect defects based on current transactions as well as the determined defect patterns. Examples of such transaction information that may be used include, but are not limited to: account number(s) involved in the financial transaction, routing number(s) involved in the financial transaction, sequence number(s) involved in the financial transaction, party name(s) involved in the financial transaction, addresses of those parties, phone numbers of those parties, transaction date(s), transaction type(s), MICR-line information, cash ticket number(s), teller ID(s), ATM ID(s), out-of-balance indication(s), branch number(s), payee information, payor information, account balances, and/or any other attributes of a financial transaction.

To determine defect patterns, the defect detection system 102 may use predictive analytics, such as machine learning algorithms, that learn from accumulated transaction information history. Such machine learning algorithms may utilize, for instance, supervised and/or unsupervised learning and may be capable of auto-detecting desired types of defects and/or utilize automation to correct certain defect types. The system may additionally or alternatively provide recommendations to human operators for resolution. Such a system may potentially allow for the implementation of appropriate information management and/or communications, and/or the facilitation of processing of transaction updates to one or more system repositories.

The transaction information history may be accumulated in data storage 104, and the storage of data therein may be managed by the data management system 103. For instance, the data management system 103 may be responsible for storing, updating, and retrieving data representing the transaction information history to/from data storage 104. In some examples, the data management system 103 may store all such transaction information for all financial transactions. In other examples, such storage may be selective for only a subset of the financial transactions processed by the banking system 101.

Data storage 104 may be implemented as one or more data storage devices that may include one or more computer-readable storage media. The computer-readable storage media may be non-transitory and/or tangible storage media, such as one or more hard drives, tape drives, optical discs, memories, and/or the like. Data storage 104 may further include one or more computing devices, such as servers, for responding to queries, updating stored data, and implementing customer relationship management (CRM) services. Data storage 104 may be embodied as a single device including a single computer-readable storage medium, or data storage 104 may alternatively be embodied as a plurality of physically separate and distributed devices including a plurality of distributed non-transitory and/or tangible computer-readable storage media.

The defect resolution system 105 may be responsible for determining what, if any, steps may be taken in response to an identified defect, such as how to implement a resolution to defects identified by the defect detection system 102, as well as whether and how to alert a party of the defect. To accomplish these tasks, the defect resolution system 105 may be configured to understand business rules of the banking system 101 and/or to understand how the banking system 101 itself functionally operates, and may intelligently make predictions as to what could be done to partially or fully reverse (for instance, cure) a defect and/or prevent the defect from occurring again. Additionally or alternatively, the defect resolution system 105 may be configured with a predetermined set of defect types and associated resolution steps. For instance, the defect resolution system 105 may associate a first type of defect with a first one or more steps for resolving (for instance, curing) the first type of defect, associate a second type of defect with a second one or more steps for resolving (for instance, curing) the second type of defect, and so on for an arbitrary number of defect types. The association of defect types with resolution steps may be implemented, for example, as a lookup table of data stored in a non-transitory computer-readable storage medium (for example, data storage 104 and/or another separate or integrated storage entity).

Thus, an input to the defect resolution system 105 may include information about identified defects (for example, from the defect detection system 102), such as the transaction information for the defect and/or an identification of the defect type. Another input to the defect resolution system 105 may include information stored in data storage 104, such as the above-mentioned lookup table and/or the defect history. An output from the defect resolution system 105 may include information (sent to, for example, the banking system 101) about how to try to resolve the defect, and/or information (sent to, for example, the service system 106) about the identified defect and/or a about an action to be taken in response to the identified defect. The information may include, for example, a description of steps to be taken that might be interpreted and carried out with the supervision of a human operator, commands for one or more computing devices of the banking system 101 and/or of the service system 106, and/or messages for one or more parties involved in the financial transaction in which the identified defect occurred.

The service system 106 may be responsible for providing various services, such as customer-oriented services, related to the defects as identified by the defect detection system 102. For example, while the defect resolution system 105 may be focused primarily on resolving and/or preventing defects, the service system 106 may be focused primarily on providing information to a party involved in the financial transaction related to the defect (for instance, a customer of the financial institution). The information provided to the party by the service system 106 may include, for example, an alert to the existence of the defect, the nature of the defect, and/or any resolution to the defect being implemented and/or recommended; a message offering one or more financial products (for example, services) that could be provided to the customer (for example, by the financial institution and/or by a third party) that may be related to the defect, such as a product that may help avoid that defect in future financial transactions; and/or any other information based on the defect, a profile of the party involved (for instance, a customer profile), and/or the financial transaction information.

Figure 2:
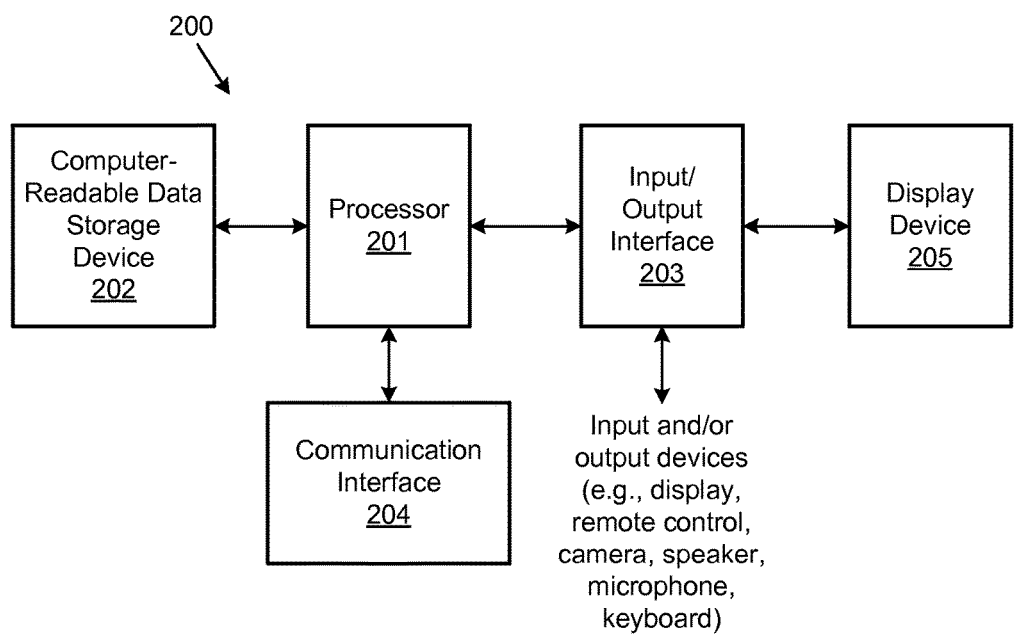
FIG. 2 illustrates an example hardware and/or software platform on which any of the various elements described herein, such as the elements of FIG. 1, may be partially or fully implemented.

FIG. 2 illustrates an example of general hardware and/or software elements that can be used to partially or fully embody any of the various devices and functions discussed herein, such as any of those elements discussed herein with regard to FIG. 1. A computing device 200 (also often referred to as a computer) may include one or more processors 201, which may execute computer-executable instructions of a computer program (for example, software) to perform any of the features described herein. The instructions may be stored in any type of tangible and/or non-transitory computer-readable data storage device 202 (which may include one or more computer-readable storage media, such as a memory or hard drive) to configure the operation of the processor 201. For example, instructions may be stored in a read-only memory (ROM), a random access memory (RAM), a removable media such as a Universal Serial Bus (USB) drive, compact disc (CD) or digital versatile disc (DVD), a floppy disk drive, an attached (or internal) hard drive, and/or any other desired data storage medium.

The computing device 200 may include or be coupled to one or more output devices, such as a display device 205 (for example, an external television, or a computer monitor), and may include one or more output device controllers, such as a video processor. The display device 205 may be physically separate from the computing device 200, or it may be integrated with the remainder of the computing device 200. There may also be one or more user input devices, such as a remote control, camera, keyboard, mouse, touch screen, microphone, etc. The computing device 200 may also include a communication interface 204, which may include one or more input and/or output circuits (for example, in the form of a network card) configured to communicate with an external device and/or network. The communication interface 204 may include one or more wired interfaces, wireless interfaces, or a combination of the two.

Figure 3:
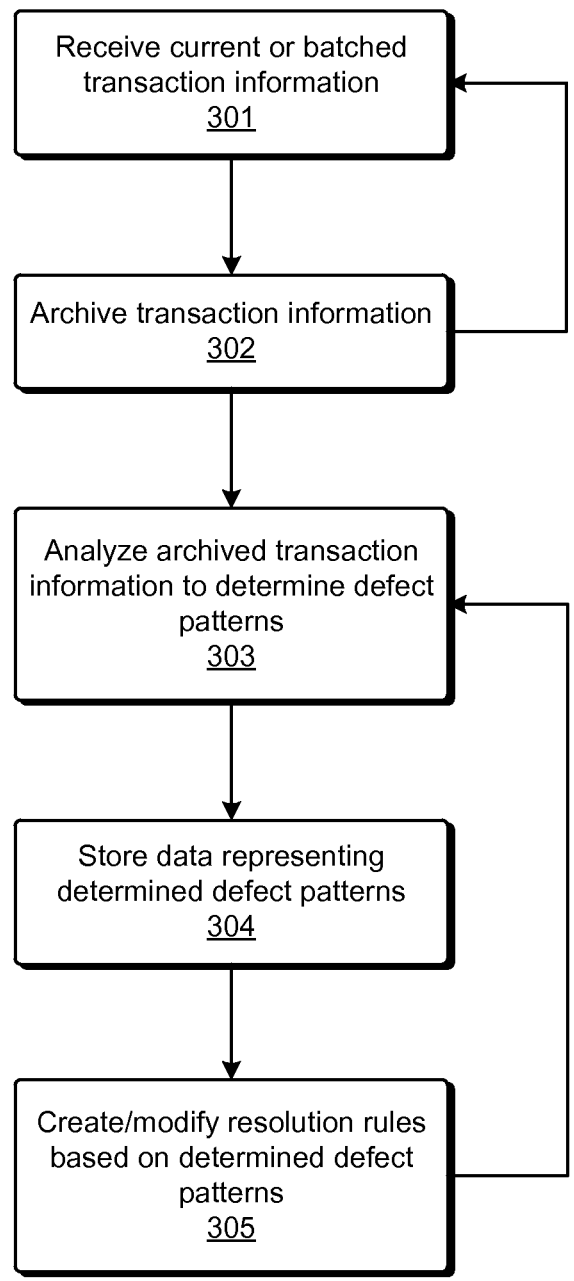
FIG. 3 is a flow chart of an example defect pattern determination method that may be performed in accordance with one or more aspects as described herein.

FIG. 3 is a flow chart of an example defect pattern determination method that may be performed in accordance with one or more aspects as described herein. The various steps in the flow chart may be partially or fully performed by one or more devices, such as any of the elements of FIG. 1, and/or by humans. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 301, transaction information for a current transaction or for a batch of a plurality of transactions being presented to the banking system 101 may be received by, for instance, the defect detection system 102 and/or the data management system 103. The banking system 101 may also receive the transaction information. The transaction information, as discussed above, may include any information about the financial transaction(s), such as but not limited to, account number(s) involved in the financial transaction, routing number(s) involved in the financial transaction, sequence number(s) involved in the financial transaction, party name(s) involved in the financial transaction, addresses of those parties, phone numbers of those parties, transaction date(s), transaction type(s), MICR-line information, cash ticket number(s), teller ID(s), ATM ID(s), out-of-balance indication(s), branch number(s), payee information, payor information, account balances, and/or any other attributes of a financial transaction.

At step 302, some or all of the received transaction information may be archived, such as by being stored in one or more non-transitory computer-readable media. For instance, the data management system 103 may cause some or all of the received transaction information to be stored as data in data storage 104. The stored data may be organized in such a manner that, for instance, the transaction information for each given financial transaction is logically grouped together. Moreover, the stored transaction information may be organized, for example, so as to be searchable such as by a database query system that may be included as part of the data management system 103.

The data retrieval and archival functions of steps 301 and 302 may be repeated on a continuous or intermittent (for example, periodic) basis, and/or on an on-demand basis, such as in response to new financial transactions and/or new batches of financial transactions. The transaction information may be pushed to or pulled by the defect detection system 105 and/or the data management system 103, as desired. At any time during or after performance of steps 301 and 302, steps 303-305 may also be performed. Thus, for instance, steps 303-305 may be performed in parallel with steps 301 and 302. Moreover, in some embodiments, any of steps 303-305 may be performed independently of steps 301 and 302 (for instance, independently of whether new transaction information is received and/or archived in steps 301 and/or 302). In other embodiments, any of steps 303-305 may be performed in response to new transaction information being received and/or archived in one or both of steps 301 and 302.

At step 303, the defect detection system 102 (for example) may retrieve some or all of the transaction information stored in data storage 104 (which may at least include any new transaction information recently stored yet not yet analyzed by the defect detection system 102). The defect detection system 102 may then analyze the retrieved transaction information to determine defect patterns such as in the manner discussed above.

At step 304, the defect detection system 102 may use predictive analytics to generate data representing the determined defect patterns, and may cause this generated data to be stored in data storage 104 and/or another non-transitory computer-readable medium. At step 305, the defect detection system 102 may also use, for example, predictive analytics to create and/or modify classifiers, rules, and/or other information based on the determined defect patterns. Both of these steps may result in data representing various outputs of types that may be well-known in the art, such as but not limited to defect patterns, classifiers, and/or rules. The storage of any data generated by the defect detection system 102 may be performed and/or managed by the data management system 103.

The defect detection system 102 may implement predictive analytics logic, such as machine learning algorithms that are currently well-known in the art, to recognize the defect patterns. The machine learning algorithms may be supervised and/or unsupervised.

Examples of supervised learning techniques that may be utilized by the defect detection system 102 may include: Bayesian classifiers, decision trees, neural networks, regression (logistic model and/or probit model), and/or support-vector machines. The defect detection system 102 may create classifiers and train on (for example, apply) the classifiers using the historical transaction information stored in data storage 104. The various defects associated with financial transactions within the banking system 101 may be auto-detected by the trained classifiers of the defect detection system 102.

Examples of unsupervised learning techniques that may be utilized by the defect detection system 102 may include clustering algorithms, such as canopy, fuzzy k-means, k-means, and Dirichlet. In this case, the historical transaction information stored in data storage 104 may be analyzed using unsupervised learning techniques. Thus, one or more clustering algorithms, for example, may be used by the defect detection system 102 to automatically detect and/or categorize the various defects associated with the financial transactions.

The machine learning algorithms may be utilized by the defect detection system 102 in any of various combinatorial optimizations and applied to the historical transaction information stored in data storage 104. Subsequently, upon learning the various patterns from historical information, the defect detection system 102 may generate various logical rules (for instance, business rules), which may then be applied to certain types of financial transaction and defects. The syntax of the generated rules may be based at least in part on the determined defect patterns.

For example, suppose the following defect pattern is detected: a particular customer regularly deposits a paper check at a bank facility where the amount written on the check and the amount written on the deposit slip are different. Based on this historical pattern, a rule that may be generated could be as follows: (1) compare the check amount with the deposit slip amount; (2) if the amounts are identical, then proceed with normal check processing; (3) if the amounts are different, then perform (one or more identified) resolution steps. As another example, suppose the customer deposits paper check, but rather than the amounts being in error, the account number of the deposit slip is often incorrect (perhaps there is an error in the issued pre-printed deposit slips or in the handwritten account number). Based on this historical pattern, a rule that may be generated could be as follows: (1) compare the account number written on the deposit slip with known information about the depositing customer; (2) if the account numbers are identical, then proceed with normal check processing; (3) if the account numbers are different, then perform (one or more identified) resolution steps.

Figure 4:
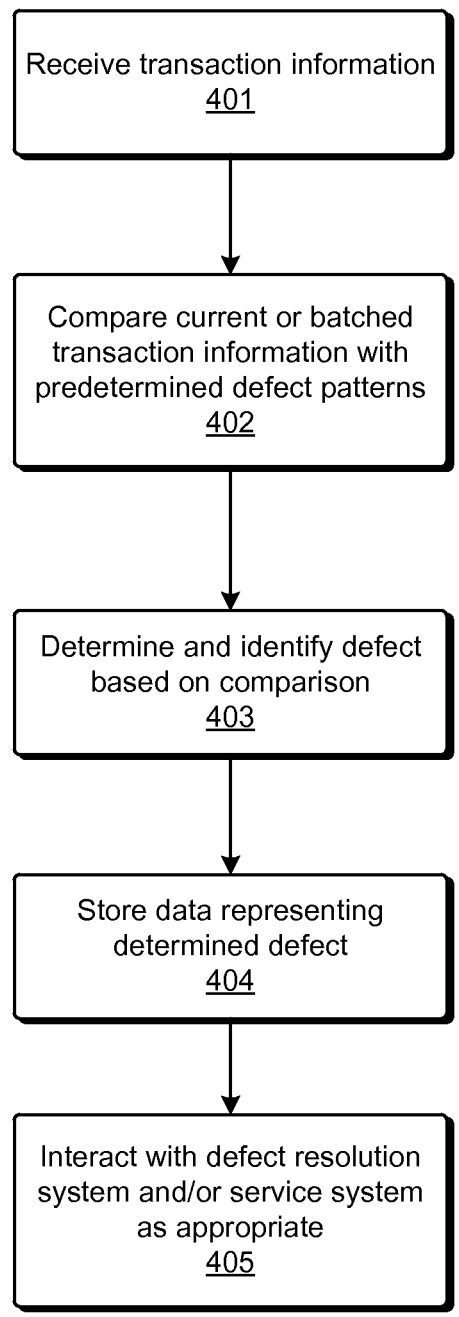
FIG. 4 is a flow chart of an example defect detection method that may be performed in accordance with one or more aspects as described herein.

FIG. 4 is a flow chart of an example defect detection method that may be performed in accordance with one or more aspects as described herein. This method may be performed on any new financial transactions, or batches of new financial transactions, and may be applied to such new financial transactions. The various steps in this flow chart may be partially or fully performed by one or more devices, such as any of the elements of FIG. 1, and/or by humans. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 401, transaction information for one or more financial transactions stored in data storage 104 may be retrieved by the defect detection system 102 for analysis. At step 402, the defect detection system 102 may analyze the retrieved transaction information, such as by applying the previously-determined rules and/or classifiers to the transaction information. Step 402 may also involve the defect detection system 102 comparing the transaction information with the already-determined defect patterns.

At step 403, using the result of the analysis of step 402, the defect detection system 102 may determine one or more defects that are part of the known patterns. At step 404, the defect detection system 102 may store data, such as in data storage 104 (for example, via the data management system 103), representing some or all of the determined defects.

At step 405, the defect detection system 102 may interact with the defect resolution system 105 and/or with the service system 106 to initiate any possible resolutions to the defects. For example, the defect detection system 102 may determine, based on one or more rules that may have been generated using the above-discussed analytics, that a particular defect may be resolved in a particular manner that the defect resolution system 105 may be capable of performing, such as by modifying the transaction information.

As discussed above, the defect resolution system 105 may be responsible for overseeing the resolution of defects, and/or for correcting the defects in the banking system 101. The service system 106 may also be responsible for resolution, but it may be more for helping to resolve a defect by interacting with third parties (such as payors and/or payees of financial transactions), such as by sending the third parties one or more messages about the defects and/or receiving instructions from the third parties.

As an example, if it is determined that the defect is part of a pattern of defects in which the account number on the deposit slip is incorrect, then the defect detection system 102 may provide a message indicating the defect, the financial transaction in which the defect occurred, and/or a recommended resolution, to the defect resolution system 105. In response, the defect resolution system 105 may interact with the banking system 101 (for example, by communicating with one or more servers of the banking system 101) to correct the account number associated with the financial transaction in which the defect occurred. In addition or alternatively, the defect resolution system 105 may determine that it is appropriate to contact one or more parties involved in the defect, and thus to send a message to the service system 106 identifying the defect, the financial transaction, and/or a recommended resolution. In response, the service system 106 may interact with one or more parties associated with the financial transaction (such as the payor and/or the payee) by, for example, sending those parties a message indicating the defect and/or indicating a resolution to the defect that is to be made or that is recommended.

Figure 5:
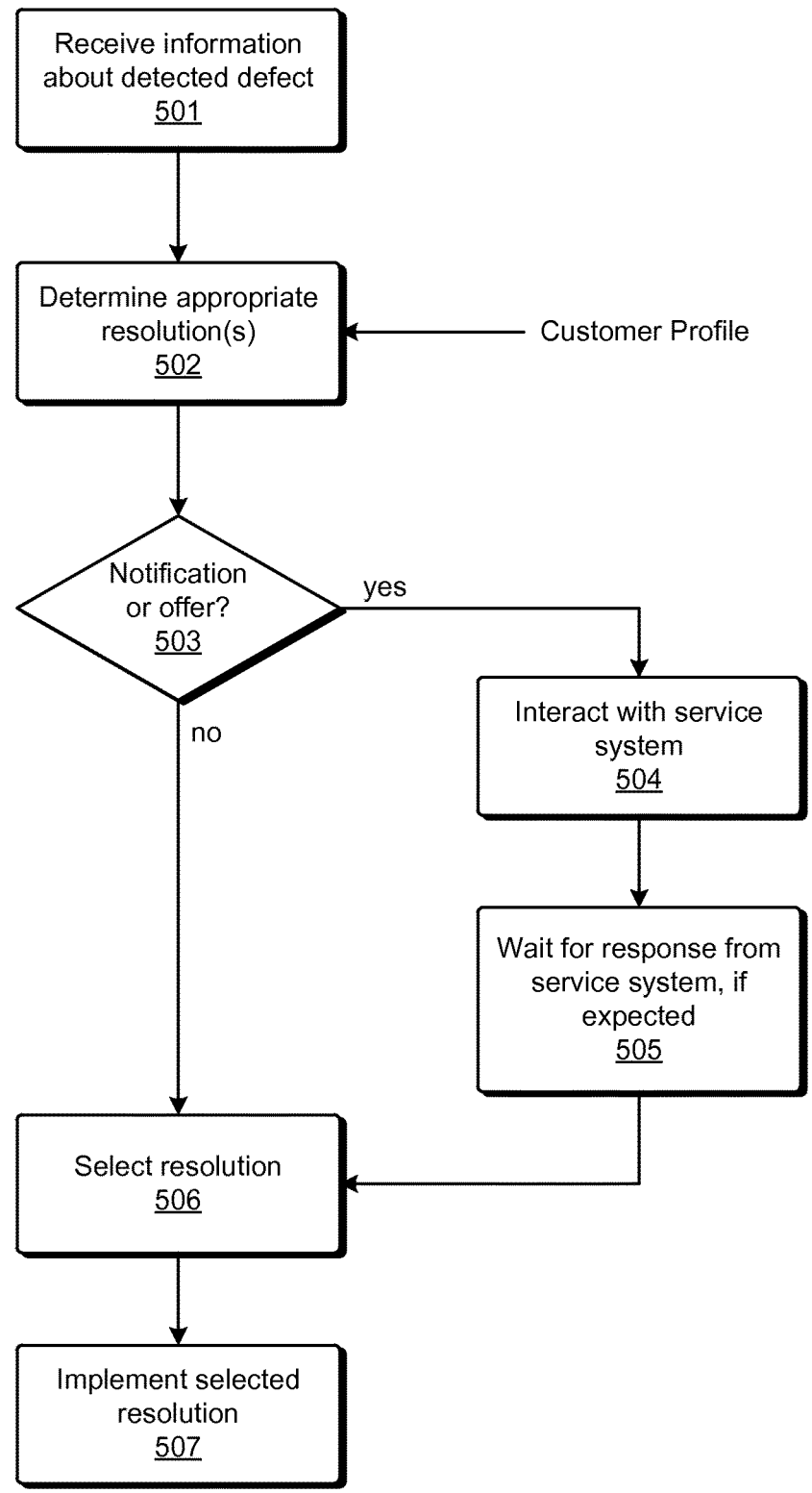
FIG. 5 is a flow chart of an example defect resolution method that may be performed in accordance with one or more aspects as described herein.

FIG. 5 is a flow chart of an example defect resolution method that may be performed in accordance with one or more aspects as described herein. The various steps in this flow chart may be partially or fully performed by one or more devices, such as any of the elements of FIG. 1, and/or by humans. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

As discussed above, the defect resolution system 105 may receive a message about a detected defect from the defect detection system 102. This illustrated in steps 405 and 501.

At step 502, in response to the message, the defect resolution system 105 may use a rules-based engine to determine one or more appropriate resolutions to the identified defect. The one or more resolutions determined at step 502 may involve, for example, notifying a third party (for instance, a payee and/or payor of the financial transaction in which the defect occurred) about the defect, requesting third party input as to resolving the defect, notifying the third party of how the defect is being resolved, providing an offer to the third party of a financial product that may be helpful in reducing or even preventing such a defect in the future, and/or modifying the transaction information for the financial transaction in which the defect occurred. Where multiple possible resolutions are determined, the various resolutions may be ordered relative to one another, such as by level of recommendation.

If the determined resolution involves interacting with a third party, then the defect resolution system 105 may perform step 504 and communicate with the service system 504. If the determined resolution does not involved interacting with a third party, then the defect resolution system 105 may perform step 506 and select the appropriate resolution (assuming there may be more than one possible resolution to select from as determined in step 502). If there is no other input provided, then the highest-recommended resolution may be selected by default. In some examples, the particular resolution that is selected at step 506 may depend upon one or more factors external to the financial transaction (for instance, environmental factors), such as the time of day, the day of week, customer profile information, and the like. If the process has moved instead from step 503 to step 504, then step 506 may be put on hold (for instance, not yet performed or completed) until an expected response is received from the service system 106 at step 505, and/or until a predetermined timeout period has expired.

Referring back to step 504, in some instances, the service system 106 may be instructed to communicate with one or more third parties. The communication may be in the form of sending a message. The communication may be merely informative, such as by providing information about a defect. Additionally or alternatively, the communication may request an interactive response from the third party. Where the communication is merely informative, the communication may include information such as, but not limited to, an indication of the financial transaction, the nature of the defect in the financial transaction, one or more recommended resolutions to the defect, a current status of any of those recommendations, an expected date and/or time that the resolution will be completed, and/or an expected effect that the resolution(s) would have on one or more financial accounts. Where the communication is such that a response by the third party is expected, the communication may include any or all of the above information as well as one or more questions and/or user-selectable options. Such an interactive communication may be responded to by the third party by selecting one of the presented options and/or by entering text into a text box, for example. The response by the third party may use any means of communication, such as but not limited to email, a text message (SMS), a voice message, a telephone call from a human and/or a computer, a mailed or otherwise delivered physical paper letter, a fax, a computer-readable disc, a twitter entry, an RSS feed, and/or an instant message.

The communication to the third party may also be in any form, such as in the form of an email, a text message (SMS), a voice message, a telephone call from a human and/or a computer, a mailed or otherwise delivered physical paper letter, a fax, a computer-readable disc, an RSS feed, and/or an instant message. For instance, referring to the example in which the account number is incorrect, the message may include content such as, "This is to notify you that your recent deposit of check #XXX in the amount of $YYYY is being corrected as follows: the account number indicated on the deposit slip of AAAAAAA is being corrected to BBBBBBB. If you have any questions, please call us." Where the message is sent with the expectation of a response, the message might be, for instance: "This is to notify you that your recent deposit of check #XXX in the amount of $YYYY appears to have the following error: the account number indicated on the deposit slip of AAAAAAA should probably be BBBBBBB. Please respond with a text message of 'change' if you would like us to make the correction." The above interactive example assumes that the message and the reply are in the form of text messages. However, the message and the reply may be in any type of message format desired. In other examples, more than once choice for responding may be provided, such as a plurality of user-selectable choices each for a different proposed resolution.

The message sent to the third party may additionally or alternatively include a marketing offer, such as an offer for a product (for instance, a financial account service and/or feature). The product may be selected as being a product that may be expected to reduce the likelihood or even prevent the defect from occurring again. For example, if the defect that repeatedly occurs, for a given customer, is an error in the paper deposit slip, that customer may be offered and/or otherwise informed of the possibility of using mobile phone camera check depositing (by taking a photograph of the check).

Regardless of the content of the communication sent to the third party in step 504, if there is an expected response from the third party, then at step 505 the system may wait for the expected response. The system may refrain from performing step 506 until the response from the third party is received, and/or until a predetermined wait time (for instance, a timeout period) has expired. The wait time may begin from the time that the message is sent or delivered to the third party. If the response is received or if the wait time has expired, then the process may move to step 506. At step 506, a resolution may be selected, such as from a plurality of predetermined resolutions. If the third party response includes a selection of a resolution, then the selection at step 506 may simply be to select the resolution already selected by the third party. If there is no response from the third party, then step 506 may involve performing the selection in some algorithmic way. For instance, the various predetermined resolutions may be rank ordered, and the default selection in such a situation may be the highest-ranked resolution.

At step 507, the selected resolution is implemented. Implementation of the resolution may involve, for example, the defect resolution system 105 interacting with one or more other elements such as the banking system 101. For example, where the resolution involves changing an account number, a monetary amount, a party name, and/or other information about a transaction, then the defect resolution system 105 may request permission or otherwise communicate to the banking system 101 the need for the specified change to the transaction information. In response, the banking system 101 may make the specified change and may provide confirmation feedback to the defect resolution system 105 upon doing so. The defect resolution system 105 may, in response to the confirmation from the banking system 101, send another message to the third party confirming that the defect has been resolved and/or that the change to the transaction information has been made.

In addition to or as an alternative to the defect resolution system 105 implementing any resolution at step 507, the service system 106 may respond to a third party selection in response to the above-mentioned marketing offer. If the third party has indicated a response to affirmatively select a product, for instance, based on the marketing offer, then the service system 106 may notify the banking system 101 and/or the defect resolution system 105 of the third party's desire to implement the product such as by adding the product to the third party's account with the bank (particularly where the third party is a customer of the bank).

A further example of how such a marketing offer may be determined and provided to the third party is described below with regard to FIG. 6. A marketing offer to a customer may include an offer (e.g., a suggestion) for adding and/or modifying a feature of an account that the customer has with the bank or other type of financial institution. The feature may include, for example, a financial product such as a particular type of checking, savings, investment, credit, or other account; a level of notification of certain events related to an account; a type of deposit channel, such as using a mobile phone camera to remotely deposit checks; a type of withdrawal channel; a type of funds transfer channel; a credit or debit card; a loan or line of credit; and the like. For example, in the above-discussed examples where a customer repeatedly uses the incorrect account number or deposit amount on a check deposit slip, the offer related to this pattern of defects may be to suggest that the customer try using a mobile phone application that allows the customer to deposit a check simply by taking a picture of the check using the mobile phone camera. Or, the offer may be to upgrade the customer's bank account service plan to a particular feature that send a confirmation message to the customer upon deposit, or that automatically double-checks certain information upon deposit. There are myriad possibilities for adding, modifying, and/or suggesting existing features for a customer's bank account service plan that may have a predictable outcome of reducing a particular type of defect for that customer.

Figure 6:
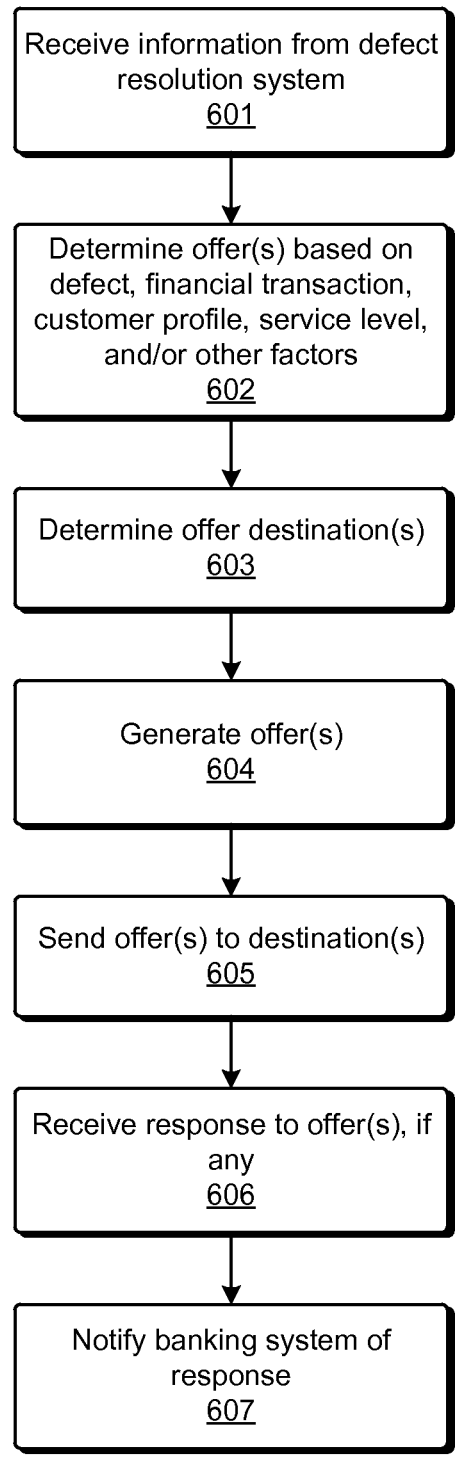
FIG. 6 is a flow chart of an example method for making offers based on defects that may be performed in accordance with one or more aspects as described herein.

FIG. 6 is a flow chart of an example method for making offers, such as marketing offers, based on defects that may be performed in accordance with one or more aspects as described herein. The various steps in this flow chart may be partially or fully performed by one or more devices, such as any of the elements of FIG. 1, and/or by humans. While certain steps may be described below as being performed by a specific element such as the service system 106, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 601, the service system 106 may receive information about a detected defect from the defect resolution system 601. In some examples, step 601 may be the same as step 501 discussed previously. At step 602, the service system 106 may determine one or more marketing offers based on the indicated defect, the transaction information for one or more financial transactions associated with the indicated defect, a customer profile of one or more parties involved in the financial transaction(s), a service level of the bank account of one or more parties involved in the financial transaction(s), historical defect patterns for those one or more parties, and/or any other factors.

The determination of the one or more marketing offers in step 602 may utilize a machine learning algorithm, a lookup table, and/or any other algorithms and/or other tools for determining the marketing offers. For example, a lookup table may be stored in data storage 104 that may associate a variety of defect types with one or more banking products and/or other types of marketing offers. The service system 106 may utilize the lookup table to determine one or more products or other marketing offers based on the indicated defect.

In another example, the service system 106 may utilize a machine learning algorithm such as any of the machine learning algorithms described above that may be used by the defect detection system 102. The machine learning algorithm may make the determination of marketing offers using any of the above-listed factors, for example, as inputs to the algorithm.

At step 603, the service system 106 may determine one or more destinations for sending one or more marketing offer messages indicating the one or more determined marketing offers. The destinations may be determined on any one or more factors, such as a customer profile of the party(ies) to which the messages are to be sent, the type of defect associated with the marketing offer, and/or the type of product being offered. Where the customer profile is used, the customer profile may include one or more contact items of information for the customer, such as one or more email addresses, mailing addresses, telephone numbers, instant message names, and the like. The customer profile may also include customer preference information such as which types of messages, and/or under which circumstances, should be sent to which destinations. For example, the customer preference information may indicate that messages requesting a response to a defect-related question be sent to a first destination, whereas messages informing the user of a marketing offer be sent to a different second destination. Of course, in some instance the same message may be used to indicate both a potential identified defect as well as a marketing offer related to the identified defect. The customer preference information may also indicate the format of the message, such as by email, telephone call, text message, or the like.

At step 604, the one or more offers may be generated. This may involve, for example, preparing and/or formatting the information that describes the one or more offers and inserting them into the message. At step 605, the service system 106 may actually send the message including the one or more offers to the determined one or more destinations.

At step 606, if a response is expected, the response from the customer may be received by the service system 106. The response may be received at any time, such as part of the response to a proposed defect resolution as in step 505 (e.g., before the associated defect is resolved). Alternatively, the response may be received at any time after the defect has been resolved. At step 607, based on the response from the customer, the service system 106 may notify the banking system 101 of the customer response. In turn, the banking system 101 may act on the notification by adding and/or modifying services related to the customer's account as appropriate. The banking system 101 and/or the service system 106 may also acknowledge the addition and/or modification of account services by sending an acknowledgment message to the customer.

The above discussion with reference to FIG. 6 has been in the context of sending marketing offers to a customer. The same process may additionally or alternatively be used to determine any other types of information to be sent to the customer, such as but not limited to defect notifications and resolution suggestions and options. Thus, FIG. 6 may be modified by changing "offer" to "notification" to cover determining and providing any type of information to the customer.

Moreover, the timing of delivery and/or the content of any messages related to a customer's account may depend upon the level of service of the customer's account. Accounts with a bank or other type of financial institution are often differentiated amongst various features. For instance, an account with a higher level of service may offer more or improved services and features than an account with a lower level of service. To obtain a higher level of service account, the customer may pay a fee (or a higher fee) as compared with a lower level of service account. Additionally or alternatively, certain qualification prerequisites may need to be satisfied to attain a particular level of service, such as an amount of money in one or more accounts, a frequency of transactions, a customer type (e.g., a private customer versus a business customer), a location of the customer and/or the bank, and/or a type of account.

A feature that may be differentiated in accordance with account level of service may be the timing of any defect-related messages to a customer. For example, at a lower level of service, the message may be sent in batches of information for multiple defects on a non-real-time schedule, such as once per month, once per week, or once per day, and not necessarily in response to the defect being detected. Thus, the notifications may be delayed and sent only at the next scheduled notification time (e.g., the next scheduled day, the next scheduled week, or the like). At a higher level of service, the message may be sent in real time and/or immediately, such as in response to determining the defect. Thus, higher levels of service may be associated with faster, e.g., intraday, notification of detected defect, whereas lower levels of service may be associated with slower, e.g., batched, notification of detected defects, or even no notification at all.

Another feature that may be differentiated in accordance with account level of service may be the content of any defect-related messages to a customer. For example, at a lower level of service, the message may simply indicate the general type of detected defect using with minimal information. At a relatively higher level of service, the message may provide more information about the defect. For example, as compared with the lower level of service, the message under the higher level of service may include an image of any monetary item (e.g., a check) involved in the defect, a listing of historical defects and/or patterns determined to be related to the defect, a suggested one or more ways to resolve the defect, a request to provide instructions for resolving the defect, and/or notification of current (e.g., real-time and/or intraday) status of any defect resolution being implemented. Any of these items of information may or may not be included, depending upon the level of service of the account for which the message is generated.

Yet another feature that may be differentiated in accordance with account level of service may be the availability of information to a customer via an information portal such as a website of the bank or other financial institution. For example, at a lower level of service, the customer may or may not receive notifications, and may not have access to much if any defect information via the website. At a higher level of service, the customer may or may not receive notifications, and may have more access to information via the website. AT higher levels of service, the customer may be able to access more information such as historical defects, indications of defect patterns, a current (e.g., real-time and/or intraday) status of defect resolution, and the like. Thus, higher levels of service may be associated with more access to defect-related information via the information portal, whereas lower levels of service may be associated with less (or even no) access to defect-related information via the information portal.

The ability to obtain information about the current status and/or future planned steps in resolving a defect may itself be a feature that could be offered, such as via any of the marketing offer examples described herein. This feature may be offered as part of an account level of service and/or on a paid subscription basis. Where available on a subscription basis, different levels of subscription may be offered, depending upon the amount of visibility to the defect information that is desired. Where the customer is capable, such as in the case of a business customer, the customer may be able to use the defect information to perform its own defect analysis. Thus, using such information, any of the defect analysis (e.g., pattern detection, defect identification, and/or determination of appropriate resolution) that was previously described as being performed by the defect detection system 102 and the defect resolution system 105 may be performed partially or entirely by the customer. This may provide a customer-driven defect detection and/or resolution option that may be desirable to those types of customers that wish to exert a high level control over defect risks. The customer may further be able to send requests to the system (e.g., to the banking system 101 and/or to the service system 106) to perform specified steps to take to resolve certain defects, where the steps are determined using the customer's own analysis.

Such customer-driven defect handling may further allow the customer to take certain resolution steps on their own, and under their own control, based on the defect analysis. For example, the customer, upon detecting a defect, may choose to initiate a stop payment and/or setup and manage any desired special instructions regarding account adjustments.

Examples of information that may be provided under the customer-driven defect handling model may include, but are not limited to, the number (e.g., percentage) of reject repair items, the number (e.g., percentage) of returns, the number (e.g., percentage) of items received from payroll check corrections, and the like.

The various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method directed to an improved automated teller machine equipped with a defect detection system that results in a technological improvement over operation of existing automated teller machines, comprising:
   receiving, at an automated teller machine (ATM) comprising the defect detection system, a paper check and a deposit slip, wherein the paper check comprises a first currency amount and a payee name, and the deposit slip comprises a second currency amount and an account number;
   identifying, by the ATM, that the first currency amount matches the second currency amount by optically detecting on the paper check a first text corresponding to the first currency amount and optically detecting on the deposit slip a second text corresponding to the second currency amount;
   optically detecting, by the ATM, the account number on the deposit slip;
   optically detecting, by the ATM, the payee name on the paper check;
   identifying, by the defect detection system in the ATM, that the account number on the deposit slip contains a typographical error by:
   retrieving, by the defect detection system, historical transaction information corresponding to one or more financial transactions from a non-transitory data storage device communicatively coupled to the defect detection system;
   searching, by the defect detection system in the ATM, the payee name in the non-transitory data storage device;
   analyzing, by the defect detection system, the retrieved historical transaction information to identify one or more defect patterns using predictive analytics, wherein the predictive analytics comprises one of a supervised learning technique or an unsupervised learning technique; and
   detecting, by the defect detection system, a defect in a financial transaction based on a comparison of the financial transaction to the one or more defect patterns determined from the retrieved historical transaction information;
   transmitting, by the defect detection system, an user interactive message including information corresponding to the detected defect to a defect resolution system in the ATM;
   determining, by the defect resolution system in the ATM, a resolution to the identified defect based on a type associated with the defect,
   determining a destination, by a service system, based on a user profile associated with the financial transaction and the type associated with the defect, the user profile including one or more destinations that are set according to one or more user preferences;
   sending, over a network, by the service system, a message to the destination identifying the defect, wherein the user interactive message requests an instructional response; and
   resolving in real-time the typographical error, by the defect resolution system in the ATM, by changing the optically detected account number to a corrected account number.

2. The method of claim 1, wherein said sending comprises sending a text message to a cellular telephone.

3. The method of claim 1, wherein the message comprises a plurality of user-selectable options for resolving the defect, and wherein the method further comprises:
   receiving, over the network, by the service system, a response to the message, the response including a user selection of one of the user-selectable options; and
   resolving, by the defect resolution system, the defect in accordance with the user selection.

4. The method of claim 3, wherein the response is a text message from a cellular telephone.

5. The method of claim 3, further comprising ranking, by the defect resolution system, the user-selectable options in an order, wherein the message indicates the ranked order of the user-selectable options.

6. The method of claim 1, wherein the message comprises a plurality of user-selectable options for resolving the defect, and wherein the method further comprises:
   waiting, by the service system, for a predetermined time period for a response to the message; and
   if the response to the message is not received, then resolving, by the defect resolution system, the defect using one of the user-selectable options for resolving the defect.

7. The method of claim 6, further comprising ranking, by the defect resolution system, the user-selectable options in an order, wherein said resolving comprises resolving the defect using a highest-ranked one of the user-selectable options.

8. The method of claim 6, further comprising sending, by the service system, another message to the destination indicating that the defect is being resolved.

9. A non-transitory computer-readable medium storing computer-executable instructions, that when executed by a processor, cause the processor to:
receive a paper check and a deposit slip, wherein the paper check comprises a first currency amount and a payee name, and the deposit slip comprises a second currency amount and an account number;
identify that the first currency amount matches the second currency amount by optically detecting on the paper check a first text corresponding to the first currency amount and optically detecting on the deposit slip a second text corresponding to the second currency amount;
optically detect the account number on the deposit slip;
optically detect the payee name on the paper check;
identify, by a defect detection system, that the account number on the deposit slip contains a typographical error by:
retrieving, by the defect detection system, historical transaction information corresponding to one or more financial transactions from a non-transitory data storage device communicatively coupled to the defect detection system;
searching, by the defect detection system, the payee name in the non-transitory data storage device;
analyzing, by the defect detection system, the retrieved historical transaction information to identify one or more defect patterns using predictive analytics, wherein the predictive analytics comprises one of a supervised learning technique or an unsupervised learning technique; and
detecting, by the defect detection system, a defect in a financial transaction based on a comparison of the financial transaction to the one or more defect patterns determined from the retrieved historical transaction information;
transmit, by the defect detection system, an user interactive message including information corresponding to the detected defect to a defect resolution system;
determine, by the defect resolution system, a resolution to the identified defect based on a type associated with the defect;
determine a destination, by a service system, based, at least in part, on a customer profile associated with the financial transaction and the type associated with the defect, the customer profile including one or more destinations that are set according to one or more customer preferences;
send, over a network, by the service system, a message to the destination identifying the defect, wherein the message requests an instructional response; and
resolve in real-time the typographical error, by the defect resolution system, by changing the optically detected account number to a corrected account number.

10. The non-transitory computer-readable medium of claim 9, wherein said sending comprises sending a text message to a cellular telephone.

11. The non-transitory computer-readable medium of claim 9, wherein the message comprises a plurality of user-selectable options for resolving the defect, and wherein the non-transitory computer-readable medium stores computer-executable instructions, that when executed by the processor, cause the processor to:
receive, over the network, by the service system, a response to the message, the response including a user selection of one of the user-selectable options; and
resolve, by the defect resolution system, the defect in accordance with the user selection.

12. The non-transitory computer-readable medium of claim 11, wherein the response is a text message from a cellular telephone.

13. The non-transitory computer-readable medium of claim 11, wherein the non-transitory computer-readable medium stores computer-executable instructions, that when executed by the processor, cause the processor to rank, by the defect resolution system, the user-selectable options in an order, wherein the message indicates the ranked order of the user-selectable options.

14. The non-transitory computer-readable medium of claim 9, wherein the message comprises a plurality of user-selectable options for resolving the defect, and wherein the non-transitory computer-readable medium stores computer-executable instructions, that when executed by the processor, cause the processor to:
wait, by the service system, for a predetermined time period for a response to the message; and
if the response to the message is not received, then resolve, by the defect resolution system, the defect using one of the user-selectable options for resolving the defect.

15. The non-transitory computer-readable medium of claim 14, wherein the non-transitory computer-readable medium stores computer-executable instructions, that when executed by the processor, cause the processor to, by the defect resolution system, the user-selectable options in an order, wherein said resolving comprises resolving the defect using a highest-ranked one of the user-selectable options.

16. The non-transitory computer-readable medium of claim 14, wherein the non-transitory computer-readable medium stores computer-executable instructions, that when executed by the processor, cause the processor to send, by the service system, another message to the destination indicating that the defect is being resolved.

17. An apparatus comprising a processor and a non-transitory computer-readable medium storing computer-executable instructions, that when executed by the processor, cause the apparatus to:
receive a paper check and a deposit slip, wherein the paper check comprises a first currency amount and a payee name, and the deposit slip comprises a second currency amount and an account number;
identify that the first currency amount matches the second currency amount by optically detecting on the paper check a first text corresponding to the first currency amount and optically detecting on the deposit slip a second text corresponding to the second currency amount;
optically detect the account number on the deposit slip;
optically detect the payee name on the paper check;
identify, by a defect detection system, that the account number on the deposit slip contains a typographical error by:
retrieving, by the defect detection system, historical transaction information corresponding to one or more financial transactions from a non-transitory data storage device communicatively coupled to the defect detection system;

searching, by the defect detection system, the payee name in the non-transitory data storage device;

analyzing, by the defect detection system, the retrieved historical transaction information to identify one or more defect patterns using predictive analytics, wherein the predictive analytics comprises one of a supervised learning technique or an unsupervised learning technique; and detecting, by the defect detection system, a defect in a financial transaction based on a comparison of the financial transaction to the one or more defect patterns determined from the retrieved historical transaction information;

transmit, by the defect detection system, an user interactive message including information corresponding to the detected defect to a defect resolution system;

determine, by the defect resolution system, a resolution to the identified defect based on a type associated with the defect;

determine a destination, by a service system, based, at least in part, on a user profile associated with the financial transaction and the type associated with the defect, the user profile including one or more destinations that are set according to one or more user preferences;

send, over a network, by the service system, a message to the destination identifying the defect, wherein the message requests an instructional response; and resolve in real-time the typographical error, by the defect resolution system, by changing the optically detected account number to a corrected account number.

18. The apparatus of claim 17, wherein the message comprises a plurality of user-selectable options for resolving the defect, and wherein the non-transitory computer-readable medium stores computer-executable instructions, that when executed by the processor, cause the apparatus to:

receive, over the network, by the service system, a response to the message, the response including a user selection of one of the user-selectable options; and resolve, by the defect resolution system, the defect in accordance with the user selection.

19. The apparatus of claim 18, wherein the non-transitory computer-readable medium stores computer-executable instructions, that when executed by the processor, cause the apparatus to:

rank, by the defect resolution system, the user-selectable options in an order, wherein the message indicates the ranked order of the user-selectable options.

20. The method of claim 18, wherein the non-transitory computer-readable medium stores computer-executable instructions, that when executed by the processor, cause the apparatus to:

rank, by the defect resolution system, the user-selectable options in an order, wherein the resolving comprises resolving the defect using a highest-ranked one of the user-selectable options.

* * * * *